(12) United States Patent
Fulay et al.

(10) Patent No.: US 9,277,179 B1
(45) Date of Patent: Mar. 1, 2016

(54) VIDEO CONFERENCING SYSTEM AND METHOD

(71) Applicant: Google Inc., Mountain View, CA (US)

(72) Inventors: Amit Fulay, Seattle, WA (US); Chee H. Chew, Redmond, WA (US); Brian David Marsh, Seattle, WA (US); David Scrymgeour Bennett, Issaquah, WA (US); William Kuo-Wei Wen, Bothell, WA (US); Eduardo Fernandez, Renton, WA (US); Jonas E. Lindberg, Stockholm (SE)

(73) Assignee: Google Inc., Mountain View, CA (US)

( * ) Notice: Subject to any disclaimer, the term of this patent is extended or adjusted under 35 U.S.C. 154(b) by 326 days.

(21) Appl. No.: 14/039,533

(22) Filed: Sep. 27, 2013

Related U.S. Application Data

(60) Provisional application No. 61/840,139, filed on Jun. 27, 2013.

(51) Int. Cl.
*H04N 7/15* (2006.01)

(52) U.S. Cl.
CPC ..................................... *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 2007/0274496 A1* | 11/2007 | Singh | H04M 3/382 379/210.02 |
| 2008/0222295 A1* | 9/2008 | Robinson | G06F 17/30867 709/227 |
| 2008/0229215 A1* | 9/2008 | Baron | G06N 3/006 715/751 |
| 2010/0082434 A1* | 4/2010 | Chen | G06F 17/30867 705/14.55 |
| 2014/0171179 A1* | 6/2014 | Ball | G07F 17/32 463/25 |

\* cited by examiner

*Primary Examiner* — Joseph J Nguyen
(74) *Attorney, Agent, or Firm* — Remarck Law Group PLC

(57) ABSTRACT

A method and computing system for enabling a video conference between a plurality of video conference participants. A video feed associated with the video conference is broadcast to a plurality of viewers. A plurality of interactions are received from a plurality of submitters included within the plurality of viewers. A chosen interaction is selected from the plurality of interactions. The submitter associated with the chosen interaction is invited to join the video conference.

21 Claims, 4 Drawing Sheets

VIDEO CONFERENCING SYSTEM AND METHOD

RELATED APPLICATIONS

This application claims the benefit of U.S. Provisional Application No. 61/840,139, filed on 27 Jun. 2013, the contents of which are all incorporated by reference.

TECHNICAL FIELD

This disclosure relates to video conferencing and, more particularly, to allowing viewers of a video conference to participate in the video conference.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

One such use of the Internet is to allow people to video conference with each other. As video conferencing adds a video component to a communication session, such communication sessions tend to be more enjoyable for the participants. Unfortunately, video conferences typically only allow for a limited number of participants, often resulting in the exclusion of many who would have liked to participate.

SUMMARY OF DISCLOSURE

In one implementation, a computer-implemented method includes enabling a video conference between a plurality of video conference participants. The plurality of video conference participants includes a celebrity. A video feed associated with the video conference is broadcast to a plurality of viewers. A plurality of interactions are received from a plurality of submitters included within the plurality of viewers. A chosen interaction is selected from the plurality of interactions. The chosen interaction is selected by the celebrity/an agent of the celebrity. The submitter associated with the chosen interaction is invited to join the video conference. The submitter associated with the chosen interaction is added to the video conference.

In another implementation, a computer-implemented method includes enabling a video conference between a plurality of video conference participants. A video feed associated with the video conference is broadcast to a plurality of viewers. A plurality of interactions are received from a plurality of submitters included within the plurality of viewers. A chosen interaction is selected from the plurality of interactions. The submitter associated with the chosen interaction is invited to join the video conference.

One or more of the following features may be included. The submitter associated with the chosen interaction may be added to the video conference. The plurality of video conference participants may be the maximum number of participants allowed to participate in the video conference. One of the plurality of video conference participants may be removed from the video conference prior to allowing the submitter associated with the chosen interaction to join the video conference. The submitter associated with the chosen interaction may be removed from the video conference. The plurality of video conference participants may include a celebrity. The chosen interaction may be selected by the celebrity/an agent of the celebrity. The plurality of interactions may include one or more of: a question interaction; an applause interaction; a feedback interaction; a file submission interaction; and a chatting interaction. Broadcasting a video feed associated with the video conference to a plurality of viewers may include: broadcasting the video feed associated with the video conference to a viewer application utilized by one or more of the plurality of viewers. The viewer application may include one or more of: a question submission application; an applause generation application; a feedback submission application; a file submission application; and a chatting application.

In another implementation, a computing system includes a processor and memory configured to perform operations including enabling a video conference between a plurality of video conference participants. A video feed associated with the video conference is broadcast to a plurality of viewers. A plurality of interactions are received from a plurality of submitters included within the plurality of viewers. A chosen interaction is selected from the plurality of interactions. The submitter associated with the chosen interaction is invited to join the video conference.

One or more of the following features may be included. The submitter associated with the chosen interaction may be added to the video conference. The plurality of video conference participants may be the maximum number of participants allowed to participate in the video conference. One of the plurality of video conference participants may be removed from the video conference prior to allowing the submitter associated with the chosen interaction to join the video conference. The submitter associated with the chosen interaction may be removed from the video conference. The plurality of video conference participants may include a celebrity. The chosen interaction may be selected by the celebrity/an agent of the celebrity. The plurality of interactions may include one or more of: a question interaction; an applause interaction; a feedback interaction; a file submission interaction; and a chatting interaction. Broadcasting a video feed associated with the video conference to a plurality of viewers may include: broadcasting the video feed associated with the video conference to a viewer application utilized by one or more of the plurality of viewers. The viewer application may include one or more of: a question submission application; an applause generation application; a feedback submission application; a file submission application; and a chatting application.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Introduction

Figure 1:
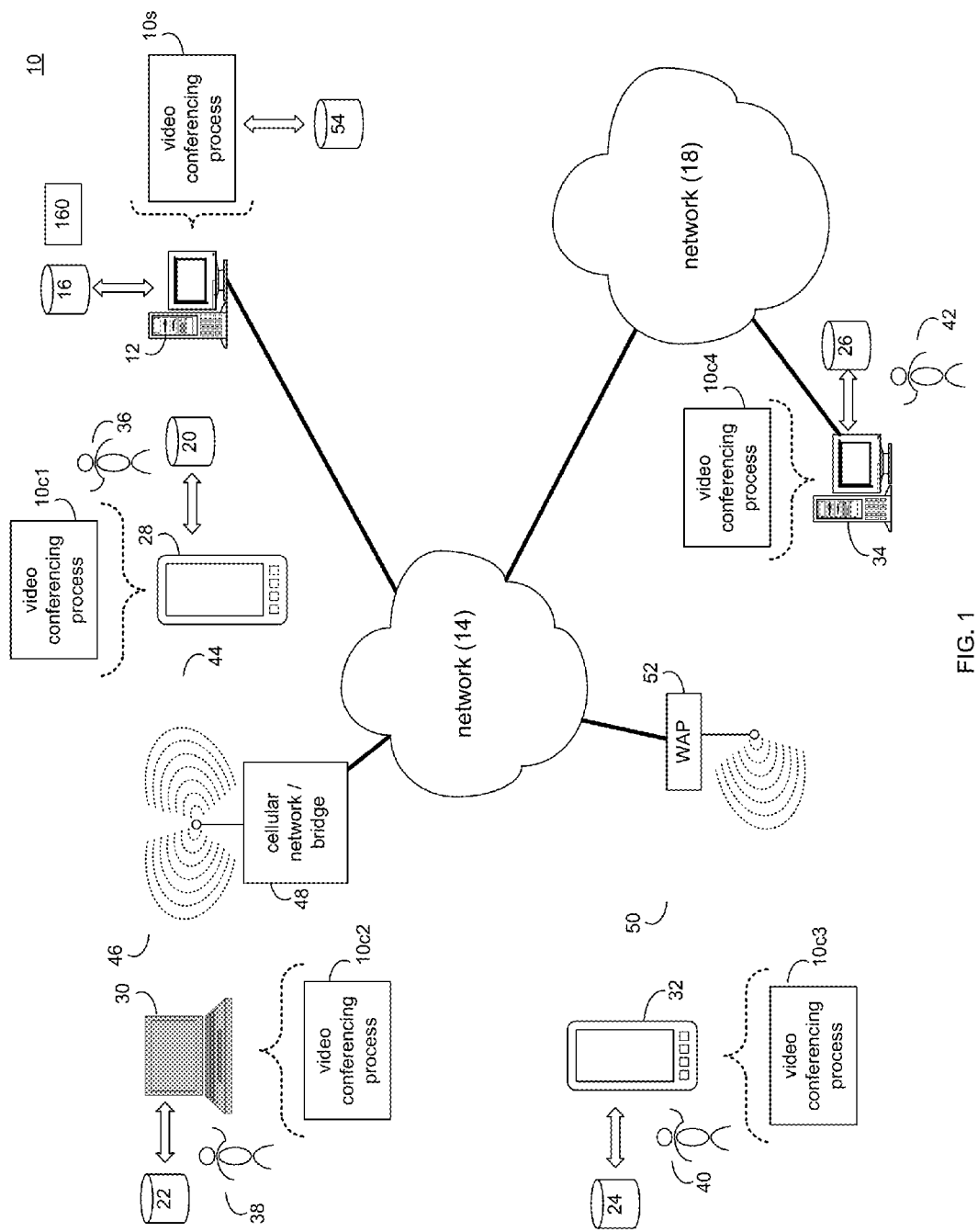
FIG. 1 is a diagrammatic view of a distributed computing network including a computing device that executes a video conferencing process according to an implementation of the present disclosure.
Figure 2:
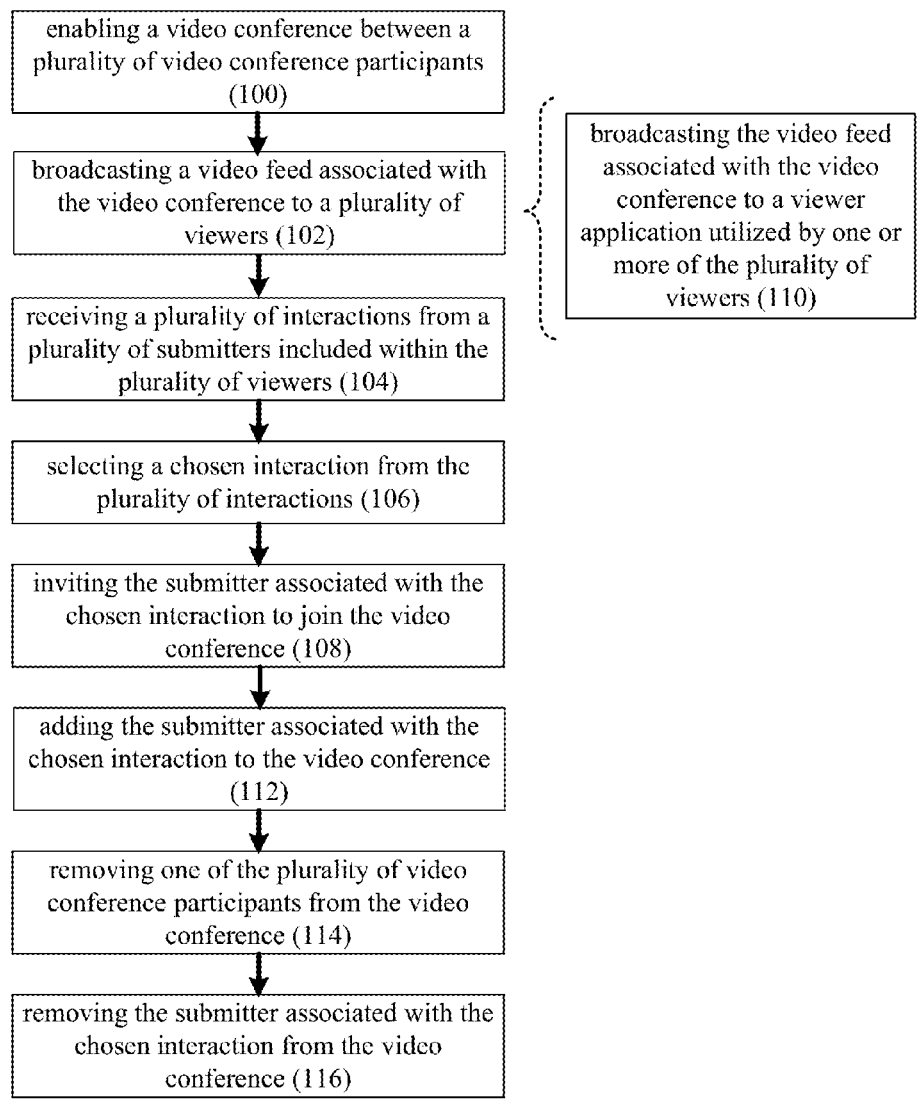
FIG. 2 is a flowchart of the video conferencing process of FIG. 1 according to an implementation of the present disclosure.

In FIGS. 1 & 2, there is shown video conferencing process 10. Video conferencing process 10 may be implemented as a server-side process, a client-side process, or a hybrid server-side/client-side process. For example, video conferencing process 10 may be implemented as a purely server-side process via video conferencing process 10s. Alternatively, video conferencing process 10 may be implemented as a purely client-side process via one or more of video conferencing process 10c1, video conferencing process 10c2, video conferencing process 10c3, and video conferencing process 10c4. Alternatively still, video conferencing process 10 may be implemented as a hybrid server-side/client-side process via video conferencing process 10s in combination with one or more of video conferencing process 10c1, video conferencing process 10c2, video conferencing process 10c3, and video conferencing process 10c4. Accordingly, video conferencing process 10 as used in this disclosure may include any combination of video conferencing process 10s, video conferencing process 10c1, video conferencing process 10c2, video conferencing process 10c3, and video conferencing process 10c4.

As will be discussed below in greater detail, video conferencing process 10 may enable 100 a video conference between a plurality of video conference participants. Video conferencing process 10 may broadcast 102 a video feed associated with the video conference to a plurality of viewers. Video conferencing process 10 may receive 104 a plurality of interactions from a plurality of submitters included within the plurality of viewers. Video conferencing process 10 may select 106 a chosen interaction from the plurality of interactions. Video conferencing process 10 may invite 108 the submitter associated with the chosen interaction to join the video conference.

Video conferencing process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of video conferencing process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of video conferencing processes 10c1, 10c2, 10c3, 10c4 may include but are not limited to a web browser, a web browser plug-in or applet, a game console user interface, a video conference user interface, or a specialized application (e.g., an application running on e.g., the Android™ platform, the iOS™ platform, the Blackberry™ platform). The instruction sets and subroutines of video conferencing processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks may be able to participate in group communication sessions, such as multiuser video conferences that may allow for virtual gatherings of people so that they may chat about specific topics.

Video Conferencing Process

Figure 3:
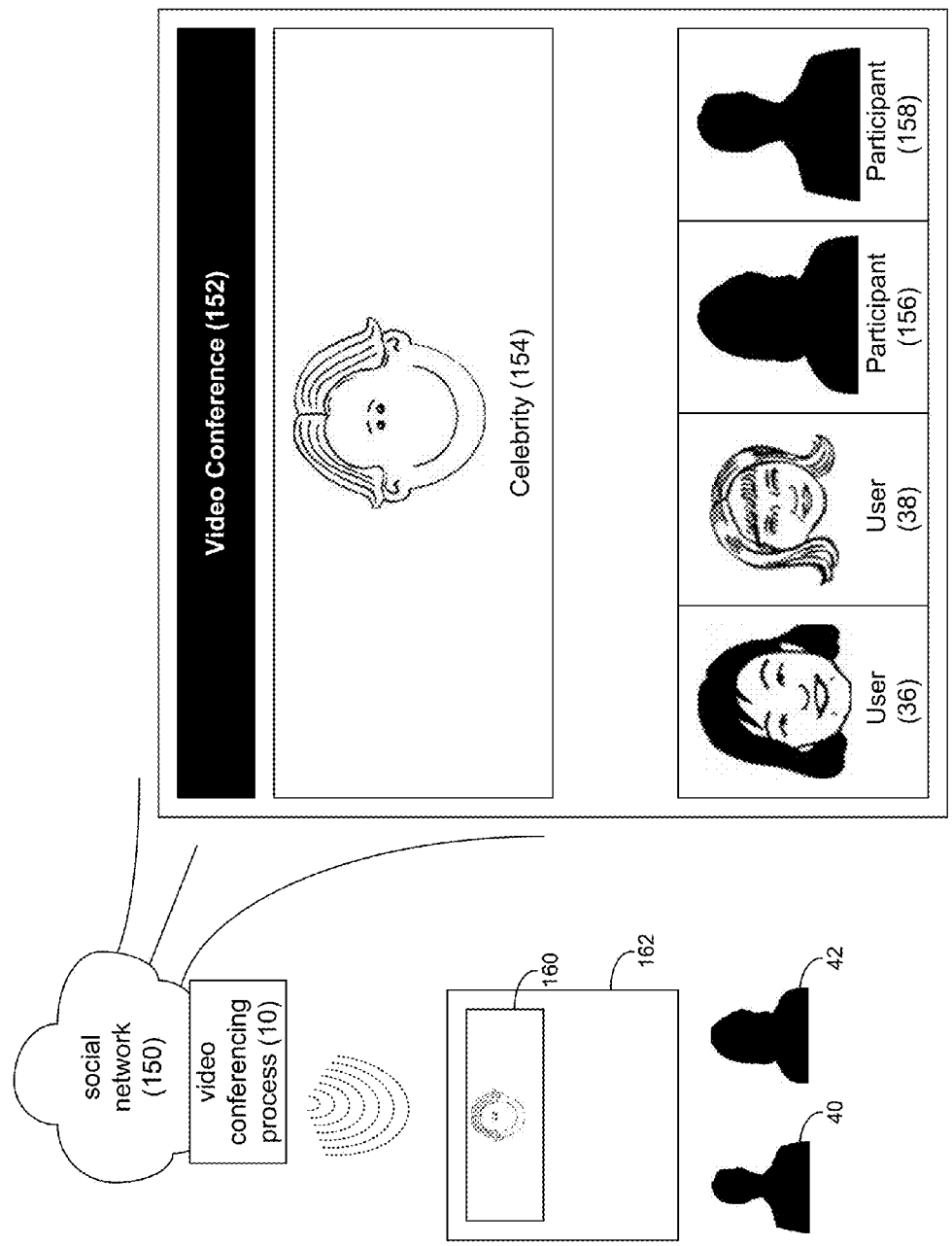
FIG. 3 is a diagrammatic view of a video conference managed by the video conferencing process of FIG. 1 according to an implementation of the present disclosure.

Referring also to FIG. 3, assume for illustrative purposes that users 36, 38, 40, 42 are all members of social network 150. Further, assume that a video conference (e.g. video conference 152) will be hosted by a celebrity (e.g. celebrity 154). During video conference 152, celebrity 154 may interact with various participants of video conference 152. Assume for illustrative purposes that celebrity 154 is a popular celebrity and video conference 152 may only accommodate a defined number of participants (e.g. a maximum of ten participants). Further, assume that users 36, 38 were selected to participate in video conference 152 (along with participants 156, 158) and that users 40, 42 were not selected to participate in video conference 152.

While the following discussion concerns video conference 152 being enabled 100 within social network 150, this is for illustrative purposes only and is not intended to be a limitation of this disclosure, as other configurations are possible. For example, video conference 152 may be enabled 100 outside of social network 150 by way of e.g. a stand-alone communications application/product (not shown). For illustrative purposes, further assume that video conference 152 may be enabled 100 through computing device 12, wherein (in this example) users 36, 38 may access video conference 152 via client electronic devices 28, 30 (respectively).

Accordingly, video conferencing process 10 may enable 100 a video conference (e.g., video conference 152) between a plurality of video conference participants (e.g., e.g., users 36, 38 and participants 156, 158).

In order to provide video conference 152 to an audience larger than e.g., ten people, video conferencing process 10 may be configured to broadcast 102 a video feed (e.g., in the form of video 160) associated with video conference 152 to a plurality of viewers (e.g., users 40, 42)

Figure 4:
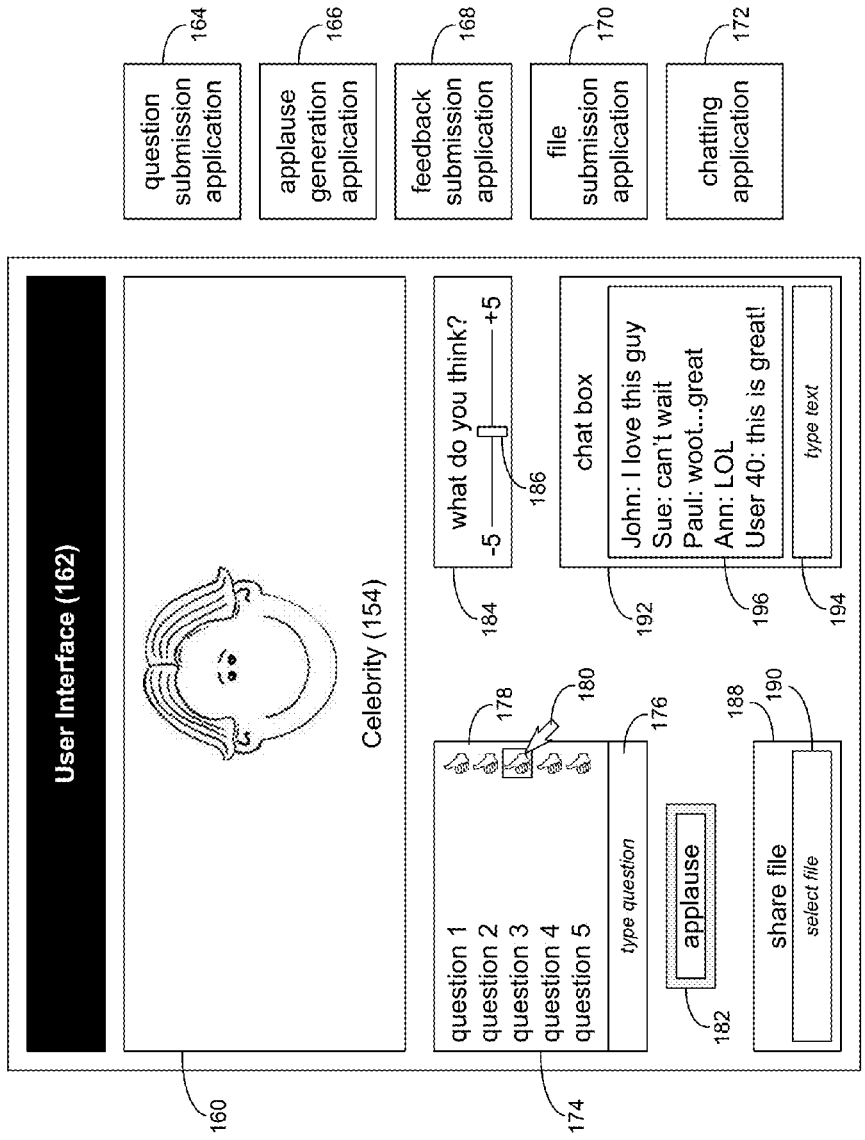
FIG. 4 is a diagrammatic view of a user interface rendered by the video conferencing process of FIG. 1 according to an implementation of the present disclosure.

Referring also to FIG. 4, video 160 may be provided to users of video conferencing process 10 who were e.g. not selected to participate in video conference 152 (e.g. users 40, 42). For example, video 160 may be broadcast 110 to e.g. users 40, 42 via network 14 and/or network 18 so that video 160 may be received by client electronic devices 32, 34 (respectively) and rendered by viewer application 162 (e.g. a user interface of a video sharing platform).

Video conferencing process 10 and/or viewer application 162 may include and/or may execute various applications, each of which may be utilized by the viewers of video 160 (e.g. users 40, 42) to interact with celebrity 154. Examples of such applications may include but are not limited to: question submission application 164; applause generation application 166; feedback submission application 168; file submission application 170; and chatting application 172. Which (if any) of applications 164, 166, 168, 170, 172 are made available to the viewers of video 160 (e.g. users 40, 42) may be controlled/decided by celebrity 154, a host of video conference 152 and/or an administrator of video conference 152. For example, if celebrity 154 is participating in video conference 152 so that celebrity 154 may issue a prepared statement (concerning their upcoming movie) to viewers of video 160, celebrity 154 may not be interested in answering any questions and, therefore, may prohibit the use of question submission application 164.

Question submission application 164 (which may be a portion of/included within/controlled by video conferencing process 10 and/or viewer application 162) may be configured to allow e.g. users 40, 42 to submit one or more questions that may be presented to celebrity 154 for potential answering. For example, question submission application 164 may render question area 174 within viewer application 162. Question area 174 may contain question field 176 that may be configured to allow users 40, 42 to enter a question and submit the same to celebrity 154. For example, if user 40 wishes to ask a question of celebrity 154, user 40 may type the question into question field 176 and e.g. hit enter, which may result in the question entered appearing within question queue 178.

The specific order in which the individual questions (e.g. question 1, question 2, question 3, question 4, question 5) appear within question queue 178 may vary depending upon the user rating received for each question. For example, question submission application 164 may be configured to allow the various viewers of video 160 to opine on specific questions included within question queue 178. Specifically, question submission application 164 may be configured to allow a viewer (e.g. user 40, 42) to provide their opinion (e.g., in the form of a thumbs-up) for a specific question by e.g. selecting (via on-screen pointer 180) the thumbs-up icon positioned proximate the appropriate question. Accordingly, the more people that select the thumbs-up icon associated with a specific question, the higher that question is ranked and, accordingly, the higher it may appear within question queue 178. Additionally, celebrity 154 may monitor the position of the various questions included within question queue 178 and may choose to address certain questions (e.g. the most highly ranked questions) within question queue 178.

Applause generation application 166 (which may be a portion of/included within/controlled by video conferencing process 10 and/or viewer application 162) may be configured to render applause button 182 that may allow viewers of video 160 to submit temporal applause to e.g. celebrity 154 whenever they like what celebrity 154 is saying/doing. For example, assume that celebrity 154 is discussing the fact that they are currently being considered for the leading role in what will most likely be a blockbuster movie. Upon hearing this, user 40 may select (via on-screen pointer 180) applause button 182, resulting in applause generation application 166 generating temporal applause that may be provided to user 154 in real time. For example and upon sensing the selection of applause button 182 by user 40, applause generation process 166 may be configured to render an audio applause file so that celebrity 154 physically hears the applause on the computer/at the studio where video conference 152 is being performed. Applause generation application 166 may assign a score to the temporal applause generated by e.g., user 40 depending upon the duration of such temporal applause. Such applause from user 40 may be averaged with applause provided by other viewers of video 160 (e.g., user 42) to generate consolidated applause, which may be provided to celebrity 154 in real time (e.g., in the form of a rendered audio signal).

Feedback submission application 168 (which may be a portion of/included within/controlled by video conferencing process 10 and/or viewer application 162) may be configured to render feedback submission area 184 that may allow viewers of video 160 to submit feedback to e.g. celebrity 154 concerning what celebrity 154 is currently saying/doing. For example, assume that celebrity 154 is discussing their position on various controversial issues, some of which user 40 agrees with and some of which user 40 does not agree with. Accordingly, user 40 may move slider 186 included within feedback submission area 184 to the left whenever user 40 disagrees with what celebrity 154 is saying. Conversely, user 40 may move slider 186 included within feedback submission area 184 to the right whenever user 40 agrees with what celebrity 154 is saying. Such feedback from user 40 may be averaged with feedback provided by other viewers of video 160 (e.g., user 42) to generate consolidated feedback, which may be provided to celebrity 154 in real time (e.g., in the form of a scrolling line chart or bar graph). This consolidated feedback may be parsed based upon demographic data prior to being provided to e.g., celebrity 154. For example, this consolidated feedback may be divided based upon age, gender, race, sexual orientation, wealth, education, marital status, etc. Therefore, such consolidated feedback may inform celebrity 154 that they do very well with single women in the 18-35 age group but not so well with married men in the 36-54 age group.

File submission application 170 (which may be a portion of/included within/controlled by video conferencing process 10 and/or viewer application 162) may be configured to render file share portion 188 that may allow a viewer of video 160 to share one or more files with e.g., celebrity 154, participants within video conference 152, and/or other viewers of video 160. For example, assume for illustrative purposes that user 40 wishes to share a photograph of celebrity 154 that user 40 took in Las Vegas. Accordingly, user 40 may identify and locate the appropriate photograph file within file location window 190 of file share portion 188 and upload the same to video conferencing process 10. Upon receiving such a photographic file, video conferencing process 10 may make this photographic file available to e.g., celebrity 154, participants within video conference 152, and/or other viewers of video 160.

Chatting application 172 (which may be a portion of/included within/controlled by video conferencing process 10 and/or viewer application 162) may be configured to render chat portion 192 that may allow the viewers of video 160 to communicate (via e.g., text messages) with each other, celebrity 154, and/or participants of video conference 152 during the broadcast of video 160. For example, assume for illustrative purposes that user 40 wishes to share the text "this is great!" with the other viewers of video 60. Accordingly, user 40 may enter "this is great!" into text entry field 194 of chat portion 192 and may hit enter, resulting in "this is great!" being posted within text window 196.

As discussed above, video conferencing process 10 and/or viewer application 162 may include and/or may execute various applications, each of which may be utilized by the viewers of video 160 (e.g. users 40, 42) to interact with celebrity 154. Examples of such applications may include but are not limited to: question submission application 164; applause generation application 166; feedback submission application 168; file submission application 170; and chatting application 172.

Further, celebrity 154 may choose to respond to such interactions from the viewers. For example, celebrity 154 may choose to answer a question (e.g., asked by a viewer via question submission application 164), respond to applause (e.g., provided by a viewer via applause generation application 166), respond to feedback (e.g., provided by a viewer via feedback submission application 168), discuss a submitted photograph (e.g., submitted by a viewer via file submission application 170) and/or respond to viewer chat (e.g., provided by a viewer via chatting application 172).

Additionally, celebrity 154 may choose to respond to such interactions personally and e.g., invite the appropriate viewer/viewers to join celebrity 154 and participate in video conference 152.

While the following discussion concerns celebrity 154 responding to a specific question asked by a viewer of video 160 (e.g., via question submission application 164), this is for illustrative purposes only and is not intended to be a limitation of this disclosure, as other configurations are possible and are considered to be within the scope of this disclosure. For example, similar situations in which celebrity 154 asks a viewer to join them within video conference 152 may occur as a result of: applause provided by a viewer via applause generation application 166; feedback provided by a viewer via feedback submission application 168; a file submitted by a viewer via file submission application 170; and/or comments/chat provided by a viewer via chatting application 172.

For illustrative purposes, assume that (during video conference 152) video conferencing process 10 receives 104 a plurality of interactions (directed towards celebrity 154) from a plurality of submitters included within the plurality of viewers (e.g., users 40, 42). Examples of such interactions may include but are not limited to: a question interaction, an applause interaction, a feedback interaction, a file submission interaction, and/or a chatting interaction.

Video conferencing process 10 may be configured to allow celebrity 154 (or an agent of celebrity 154) to select 106 a chosen interaction (e.g., question 1) from the plurality of interactions (e.g., the plurality of questions defined within question area 174) submitted by the viewers.

For example, assume that celebrity 154 particularly likes one question (e.g., question 1) that was asked of celebrity 154 by user 42. Accordingly, celebrity 154 may select 106 (via video conferencing process 10) that specific question (e.g., question 1) for answering. Once selected, video conferencing process 10 may be configured to allow celebrity 154 to invite 108 the submitter associated with the selected question (e.g., user 42 who submitted question 1) to join video conference 152 so that e.g., user 42 may directly ask the question of celebrity 154 (e.g., that was previously submitted to celebrity 154 via question submission location 164).

Assuming that user 42 accepts the invitation from celebrity 154 to join video conference 152, video conferencing process 10 may add 112 the submitter (e.g., user 42) associated with the chosen interaction (e.g., question 1) to video conference 152.

Since (as discussed above) video conference 152 may have a defined maximum number of participants allowed to participate in video conference 152, in order to add 112 a new participant (e.g., user 42) to video conference 152, an existing participant (e.g., user 38) may need to be removed 114 from video conference 152 (to make room for user 42). Accordingly, video conferencing process 10 may remove 114 one of the plurality of video conference participants (e.g., user 38) from video conference 152 prior to allowing the submitter (e.g., user 42) associated with the chosen interaction (e.g., question 1) to be added 112 to video conference 152.

Once celebrity 154 completes their interactions with (in this example user 42), video conferencing process 10 may remove 116 the submitter (e.g., user 42) associated with the chosen interaction (e.g., question 1) from video conference 152.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
  enabling a video conference between a plurality of video conference participants;
  broadcasting a video feed associated with the video conference to a plurality of viewers;
  receiving a plurality of interactions from a plurality of submitters included within the plurality of viewers;

receiving a selection of a chosen interaction from the plurality of interactions;
inviting the submitter associated with the chosen interaction to join the video conference;
adding the submitter associated with the chosen interaction to the video conference; and
removing one of the plurality of video conference participants from the video conference prior to allowing the submitter associated with the chosen interaction to join the video conference.

2. The computer-implemented method of claim 1 wherein the plurality of video conference participants is the maximum number of participants allowed to participate in the video conference.

3. The computer-implemented method of claim 1 further comprising:
removing the submitter associated with the chosen interaction from the video conference.

4. The computer-implemented method of claim 1 wherein the plurality of interactions includes one or more of: a question interaction; an applause interaction; a feedback interaction; a file submission interaction; and a chatting interaction.

5. The computer-implemented method of claim 1 wherein broadcasting a video feed associated with the video conference to a plurality of viewers includes:
broadcasting the video feed associated with the video conference to a viewer application utilized by one or more of the plurality of viewers.

6. The computer-implemented method of claim 5 wherein the viewer application includes one or more of:
a question submission application;
an applause generation application;
a feedback submission application;
a file submission application; and
a chatting application.

7. The computer-implemented method of claim 6 wherein the viewer application is configurable by an administrator of the video conference such that the administrator can select which of the question submission application, the applause generation application, the feedback submission application, the file submission application, and the chatting application is available to the user.

8. A computing system including a processor and memory configured to perform operations comprising:
enabling a video conference between a plurality of video conference participants;
broadcasting a video feed associated with the video conference to a plurality of viewers;
receiving a plurality of interactions from a plurality of submitters included within the plurality of viewers;
receiving a selection of a chosen interaction from the plurality of interactions;
inviting the submitter associated with the chosen interaction to join the video conference;
adding the submitter associated with the chosen interaction to the video conference; and
removing one of the plurality of video conference participants from the video conference prior to allowing the submitter associated with the chosen interaction to join the video conference.

9. The computing system of claim 8 wherein the plurality of video conference participants is the maximum number of participants allowed to participate in the video conference.

10. The computing system of claim 8 further configured to perform operations comprising:
removing the submitter associated with the chosen interaction from the video conference.

11. The computing system of claim 8 wherein the plurality of interactions includes one or more of: a question interaction; an applause interaction; a feedback interaction; a file submission interaction; and a chatting interaction.

12. The computing system of claim 8 wherein broadcasting a video feed associated with the video conference to a plurality of viewers includes:
broadcasting the video feed associated with the video conference to a viewer application utilized by one or more of the plurality of viewers.

13. The computing system of claim 12 wherein the viewer application includes one or more of:
a question submission application;
an applause generation application;
a feedback submission application;
a file submission application; and
a chatting application.

14. The computing system of claim 13 wherein the viewer application is configurable by an administrator of the video conference such that the administrator can select which of the question submission application, the applause generation application, the feedback submission application, the file submission application, and the chatting application is available to the user.

15. A non-transitory computer-readable medium storing instructions that, when executed by one or more processors, causes the one or more processors to perform operations comprising:
enabling a video conference between a plurality of video conference participants;
broadcasting a video feed associated with the video conference to a plurality of viewers;
receiving a plurality of interactions from a plurality of submitters included within the plurality of viewers;
receiving a selection of a chosen interaction from the plurality of interactions;
inviting the submitter associated with the chosen interaction to join the video conference;
adding the submitter associated with the chosen interaction to the video conference; and
removing one of the plurality of video conference participants from the video conference prior to allowing the submitter associated with the chosen interaction to join the video conference.

16. The computer-readable medium of claim 15 wherein the plurality of video conference participants is the maximum number of participants allowed to participate in the video conference.

17. The computer-readable medium of claim 15 wherein the operations further comprise:
removing the submitter associated with the chosen interaction from the video conference.

18. The computer-readable medium of claim 15 wherein the plurality of interactions includes one or more of: a question interaction; an applause interaction; a feedback interaction; a file submission interaction; and a chatting interaction.

19. The computer-readable medium of claim 15 wherein broadcasting a video feed associated with the video conference to a plurality of viewers includes:
broadcasting the video feed associated with the video conference to a viewer application utilized by one or more of the plurality of viewers.

20. The computer-readable medium of claim 19 wherein the viewer application includes one or more of:
a question submission application;
an applause generation application;
a feedback submission application;

a file submission application; and a chatting application.

21. The computer-readable medium of claim 20 wherein the viewer application is configurable by an administrator of the video conference such that the administrator can select which of the question submission application, the applause generation application, the feedback submission application, the file submission application, and the chatting application is available to the user.

* * * * *